US008935387B2

(12) United States Patent
Imamura

(10) Patent No.: US 8,935,387 B2
(45) Date of Patent: Jan. 13, 2015

(54) INFORMATION PROCESSING DEVICE, ADDRESS DUPLICATION HANDLING METHOD, AND COMPUTER-READABLE NON-TRANSITORY RECORDING MEDIUM

(75) Inventor: Shinya Imamura, Kahoku (JP)

(73) Assignee: PFU Limited, Ishikawa (JP)

(*) Notice: Subject to any disclaimer, the term of this patent is extended or adjusted under 35 U.S.C. 154(b) by 261 days.

(21) Appl. No.: 13/311,121

(22) Filed: Dec. 5, 2011

(65) Prior Publication Data
US 2012/0166629 A1 Jun. 28, 2012

(30) Foreign Application Priority Data

Dec. 27, 2010 (JP) ................................. 2010-289164

(51) Int. Cl.
G06F 15/16 (2006.01)
H04L 29/12 (2006.01)
H04L 12/24 (2006.01)

(52) U.S. Cl.
CPC .......... H04L 61/103 (2013.01); H04L 61/2038 (2013.01); H04L 61/2092 (2013.01); H04L 41/0873 (2013.01)
USPC ............................ 709/224; 709/236; 370/392

(58) Field of Classification Search
CPC .................. H04N 19/00545; H04N 19/00581; H04N 19/00775; H04L 12/1822; G06F 15/16
USPC ................... 709/224, 236; 370/392
See application file for complete search history.

(56) References Cited

U.S. PATENT DOCUMENTS

| 6,034,943 | A | * | 3/2000 | Kwon | 370/219 |
| 8,274,675 | B2 | * | 9/2012 | Suga et al. | 358/1.15 |
| 2001/0017857 | A1 | | 8/2001 | Matsukawa | |
| 2002/0187783 | A1 | * | 12/2002 | Sugaya | 455/435 |
| 2004/0148425 | A1 | * | 7/2004 | Haumont et al. | 709/236 |

(Continued)

FOREIGN PATENT DOCUMENTS

JP 8-186569 A 7/1996
JP 3534305 B2 6/2004

(Continued)

OTHER PUBLICATIONS

Japanese Office Action dated Jan. 28, 2014, issued in Japanese Patent Application No. 2010-289164, w/English translation (5 pages).

Primary Examiner — Tesfay Yohannes
(74) Attorney, Agent, or Firm — Westerman, Hattori, Daniels & Adrian, LLP

(57) ABSTRACT

A sensor device 20 includes a terminal detection unit 21 that detects a terminal connected to a network segment 2, a duplication detection unit 22 that detects duplication of IP addresses by comparing an IP address used by a detected terminal 10X that has been detected by the terminal detection unit 21 with a predetermined IP address, and a notification unit 23 that notifies a notification object terminal 10B that could have been notified of a MAC address of the detected terminal 10X by this detected terminal 10X, of a MAC address of a terminal other than the detected terminal 10X, when duplication of the IP addresses has been detected by the duplication detection unit 22.

15 Claims, 14 Drawing Sheets

(56) References Cited

U.S. PATENT DOCUMENTS

| | | |
|---|---|---|
| 2006/0050702 A1* | 3/2006 | Matsui et al. ............... 370/392 |
| 2007/0143841 A1* | 6/2007 | Kurakami et al. ............ 726/22 |
| 2008/0060067 A1 | 3/2008 | Kim et al. |
| 2008/0072289 A1* | 3/2008 | Aoki et al. .................. 726/3 |
| 2009/0052416 A1* | 2/2009 | Kumazawa et al. ......... 370/338 |
| 2009/0284071 A1* | 11/2009 | Mitsuoka et al. ............ 307/19 |
| 2009/0323667 A1* | 12/2009 | Doi et al. .................... 370/349 |
| 2011/0044243 A1* | 2/2011 | Yi et al. ...................... 370/328 |
| 2012/0114021 A1* | 5/2012 | Chung et al. ................ 375/211 |

FOREIGN PATENT DOCUMENTS

| | | |
|---|---|---|
| JP | 2008-520159 A | 6/2008 |
| JP | 2008-154012 A | 7/2008 |

* cited by examiner

FIG. 4

|  | IP ADDRESS | MAC ADDRESS |
|---|---|---|
| TERMINAL 10A | 192.168.0.11 | 02:00:00:00:00:0a |
| TERMINAL 10X | 192.168.0.11 | 02:00:00:00:00:xx |
| ⋮ | ⋮ | ⋮ |

FIG. 5

| RESERVED IP ADDRESS | RESERVED MAC ADDRESS |
|---|---|
| 192.168.0.11 | 02:00:00:00:00:0a |
| ⋮ | ⋮ |

INFORMATION PROCESSING DEVICE, ADDRESS DUPLICATION HANDLING METHOD, AND COMPUTER-READABLE NON-TRANSITORY RECORDING MEDIUM

CROSS-REFERENCE TO RELATED APPLICATION

This application is based upon and claims the benefit of priority of the prior Japanese Patent Application No. JP2010-289164, filed on Dec. 27, 2010, the entire contents of which are incorporated herein by reference.

FIELD

The present disclosure relates to an information processing device that monitors communication performed by terminals connected via a network.

BACKGROUND

An IP address duplication detection method is known by which duplication of IP addresses is detected by sending an ARP request to obtain a MAC address corresponding to the inputted IP address of the inspection object and determining the number of received ARP replies (see Japanese Patent No. 3534305).

An IP management method is also known that includes setting the sender address of the detected ARP packet as a protection IP, transmitting to the sender address an ARP packet that has been operated in the address that has already used the transmission IP address when the transmission MAC address is different from the designated MAC address, and transmitting a compensation packet to all of the devices on the network, wherein the compensation packet performs compensation such that the actually used MAC address of the transmission IP address becomes the designated MAC address (Japanese Translation of PCT Application No. 2008-520159).

SUMMARY

The information processing device according to the present disclosure includes a terminal detection unit to detect a terminal connected to a network; a duplication detection unit to detect duplication of upper layer addresses by comparing an upper layer address used by a detected terminal that has been detected by the terminal detection unit with a predetermined upper layer address; and a notification unit to notify a notification object terminal that could have been notified of a lower layer address of the detected terminal by this detected terminal, of a lower layer address of a terminal other than the detected terminal, when duplication of the upper layer addresses has been detected by the duplication detection unit.

The present disclosure can be also understood to include a method executed by a computer or a program executed in a computer. Further, the present disclosure can be also understood to include a recording medium readable by a computer or another device or mechanism and having such a program recorded thereon. The computer medium readable by a computer or the like as referred to herein is a recording medium that can accumulate information such as data of programs by electrical, magnetic, optical, mechanical, or chemical action, so that this information could be read by a computer or the like.

BRIEF DESCRIPTION OF THE DRAWINGS

FIG. 4 illustrates a configuration example of the terminal list according to the embodiment;

FIG. 5 illustrates a configuration example of the reservation list according to the embodiment;

DESCRIPTION OF EMBODIMENTS

An embodiment of a communication system 1 including the information processing device according to the present disclosure will be explained below with reference to the appended drawings. The communication system 1 according to the present embodiment is a communication system in which the so-called inspection (quarantine) is performed with respect, for example, to terminals connected to a network. However, the information processing device according to the present disclosure can be also used for performing monitoring or restriction of communication in systems in which no inspection is performed.

<System Configuration>

Figure 1:
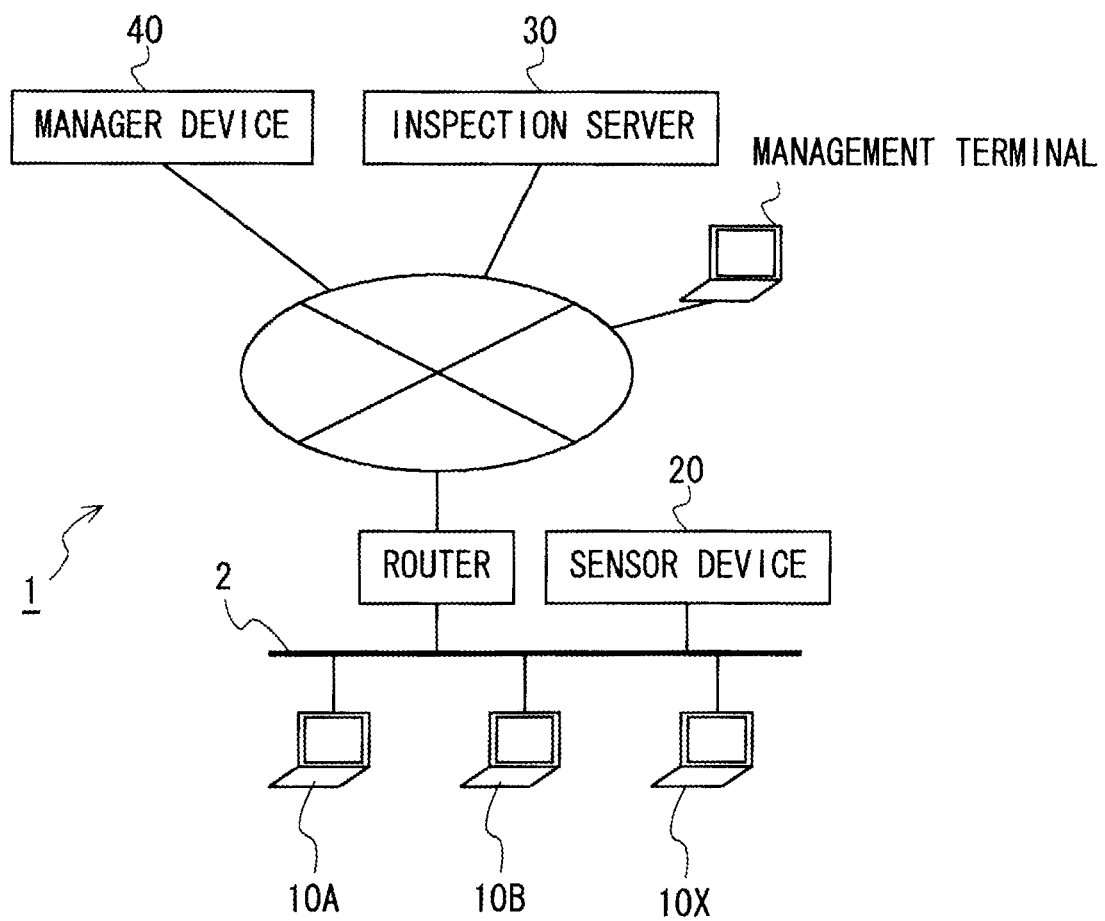
FIG. 1 is a schematic drawing illustrating the configuration of the communication system according to an embodiment.

FIG. 1 shows a configuration example of the communication system 1 according to the present embodiment. The communication system 1 according to the present embodiment is provided with a network segment 2 connected to terminals 10A, 10B, 10X, and a manager device (manager server) 40 and a inspection server 30 that are communicatively connected to the network segment 2 by a router. A sensor device 20 for cutting off the communication via the terminal for which the inspection has not been completed is also connected to the network segment 2. In the present embodiment, the terminals 10A, 10B, 10X are the terminals of the personal computer, portable information terminal or the like used by the user, but in the below-described address duplication handling processing, the detected terminal is explained as a detected terminal 10X, the terminal that has already been recorded in a terminal list by the sensor device 20 is explained as an already known terminal 10A, and a terminal that could have been notified of the MAC address of the detected terminal 10X by the detected terminal 10X is explained as a notification object terminal 10B.

The inspection server 30 provides inspection services to the terminals connected to the network segment 2. In the communication system 1 according to the present embodiment, the manager device 40 or inspection server 30 connected from each terminal in the network segment 2 or from the sensor device 20 is connected to a remote location via internet or wide area network and provided, for example, by ASP (Application Service Provider), but it is not necessary that the manager device 40 or inspection server 30 be connected to the remote location. For example, the manager device 40 or inspection server 30 may be connected to a local network where the terminals or sensor device 20 are present.

Figure 11:
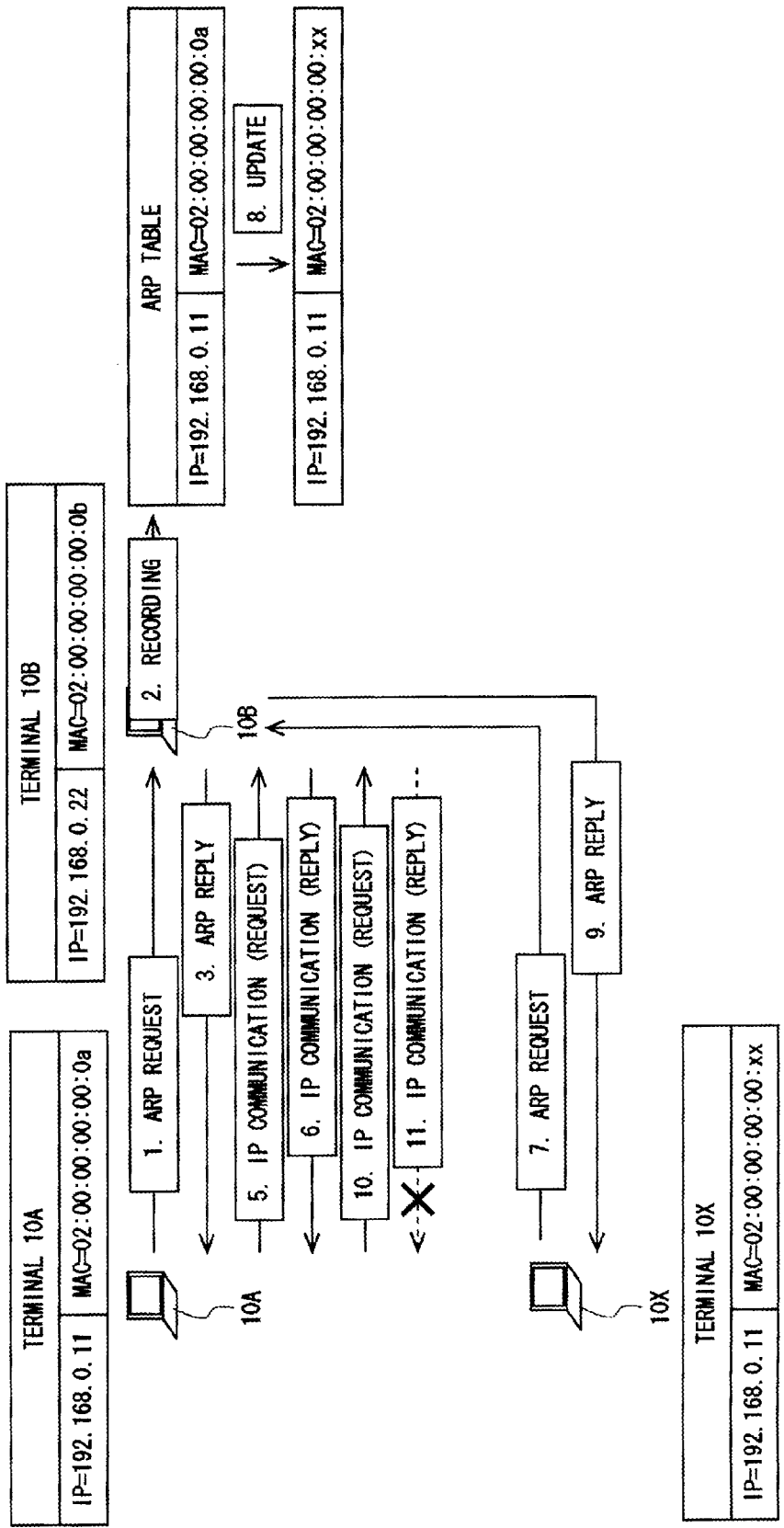
FIG. 11 shows how duplication of IP addresses occurs in a network.

In the conventional network having a configuration such as that of the communication system 1 according to the present embodiment, when the terminal detected 10X having an IP address identical to that of another terminal (for example, terminal 10A) is communicating with the terminal 10B, while the terminal 10A is communicating with the terminal 10B, the information of ARP table present in the terminal 10B and relating to the terminal 10A is overwritten by the MAC address of the terminal detected 10X and the communication between the terminal 10A and the terminal 10B is disrupted (see FIG. 11. FIG. 11 is a schematic diagram illustrating how a problem occurs due to duplication of IP addresses. The numbers assigned to the blocks indicating the processing contents in the figure represent the processing sequence).

For this reason, in the communication system 1 according to the present embodiment, the occurrence of the problem caused by duplication of IP addresses is restrained by disposing the sensor device 20 corresponding to the information processing device of the present disclosure on the network segment 2, monitoring as to whether IP addresses have duplicated in each of the devices after detecting the devices on the network segment 2, and correcting the ARP table retaining inadequate information when the duplication of IP addresses is detected.

Figure 2:
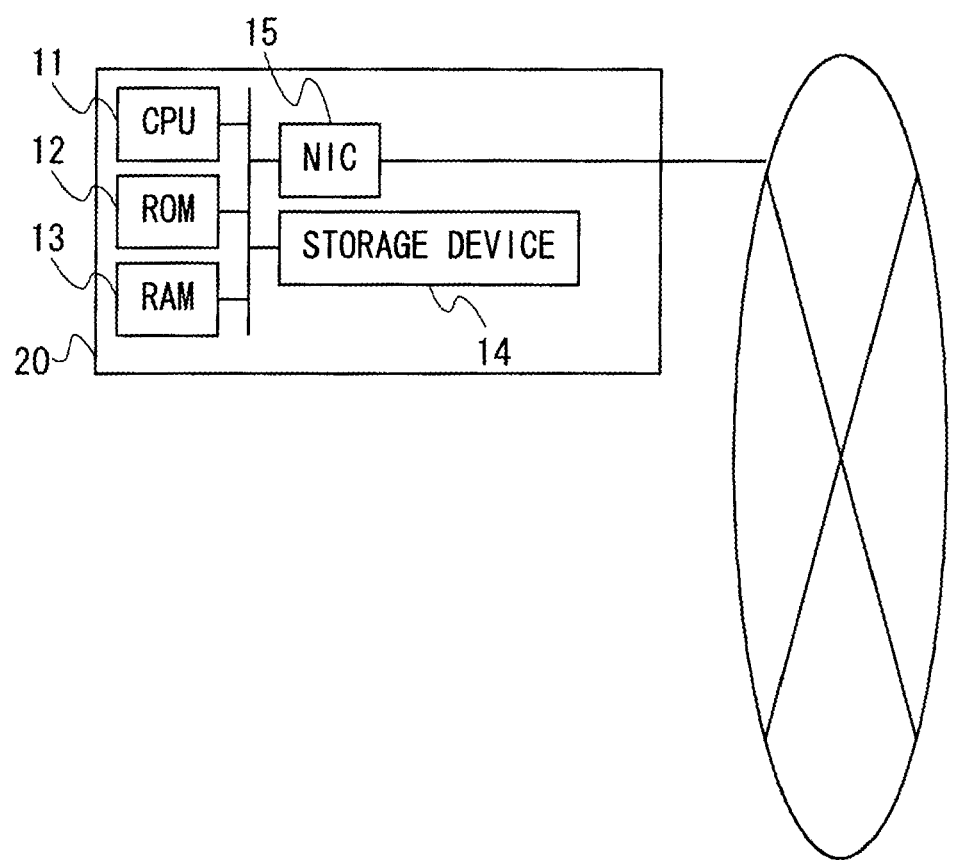
FIG. 2 shows hardware configuration of the sensor device according to the embodiment.

FIG. 2 shows an example of hardware configuration of the sensor device 20 according to the present embodiment. The sensor device 20 is a computer provided with a CPU (Central Processing Unit) 11, a RAM (Random Access memory) 13, a ROM (Read Only Memory) 12, a storage device 14 such as an EEPROM (Electrically Erasable and Programmable Read Only Memory), HDD (Hard Disc Drive) or the like, a communication unit such as a NIC (Network Interface Card) 15, and the like. As for the components (router, manager device 40, inspection server 30, terminal 10A, terminal 10B, terminal 10X, and the like) other than the sensor device 20, the terminals (devices) other than the sensor device 20, which are not shown in the figure, are also computers provided with a configuration similar to that of the sensor device 20, such that includes a CPU, a RAM, a ROM, a storage device, and a communication device, which are not shown in FIG. 2.

Figure 3:
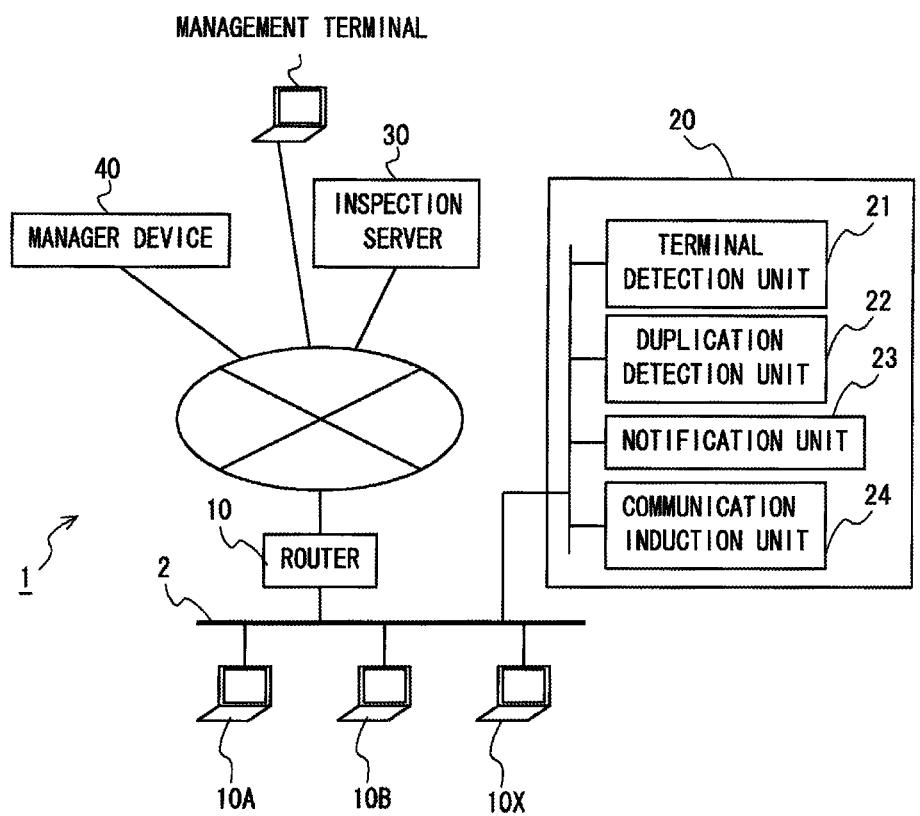
FIG. 3 illustrates schematically the mechanical configuration of the sensor device according to the embodiment.

FIG. 3 illustrates schematically the functional configuration of the sensor device 20 according to the present embodiment. Where the program stored in the storage device 14 is read into the RAM 13 and executed by the CPU 11, the sensor device 20 functions as an information processing device provided with a terminal detection unit 21, a duplication detection unit 22, a notification unit 23, and a communication induction unit 24. In the present embodiment, each function of the information processing device is executed by the CPU 11, which is a general-purpose processor, but some or all of these functions may be also executed by one or a plurality of dedicated processors.

Where a packet such as an ARP request sent from a terminal is received, the terminal detection unit 21 retrieves a terminal list by using a transmission source MAC address of the packet and determines whether or not the terminal has been registered in the terminal list, thereby detecting the terminal connected to the network segment 2. Thus, when the transmission source MAC address of the packet has been registered in the terminal list, the terminal detection unit 21 determines that this terminal is an already known terminal (known terminal 10A), and where the transmission source MAC address of the packet has not been registered in the terminal list, the terminal detection unit determines that this terminal is new and detects this new terminal as the detected terminal 10X.

The connection of the detected terminal 10X may be also detected by detecting packet communication other than ARP. For example, the connection of the detected terminal 10X may be detected by receiving another broadcast packet sent from the detected terminal 10X. Further, for example, the connection of the detected terminal 10X may be detected by actuating the NIC 15 in a promiscuous mode to enable acquisition of any kind of packet, not only a packet like the broadcast packet and the packet addressed to the sensor device 20.

The duplication detection unit 22 detects duplication of IP addresses by comparing the IP address used by the detected terminal 10X that has been detected by the terminal detection unit 21 with a predetermined IP address. For example, the duplication detection unit 22 detects duplication of IP addresses by comparing the IP address of the sensor unit 20, IP address of the known terminal 10A, and reserved IP address with the IP address used by the detected terminal 10X.

When duplication of IP addresses is detected by the duplication detection unit 22, the notification unit 23 notifies the notification object terminal 10B of the MAC address of a terminal other than the detected terminal 10X. The notification object terminal 10B is a terminal which could have been notified of the MAC address of the detected terminal 10X by the detected terminal 10X. For example, when the duplication detection unit 22 has detected duplication of the IP address used by the detected terminal 10X and the IP address of the sensor device 20, the notification unit 23 notifies the notification object terminal 10B of the MAC address of the sensor device 20. Further, when the duplication detection unit 22 has detected duplication of the IP address used by the detected terminal 10X and the IP address of the known terminal 10A, the notification unit 23 notifies the notification object terminal 10B of the MAC address of the known terminal 10A.

When the duplication detection unit 22 has detected duplication of the IP address used by the terminal detected 10X and the reserved IP address, the notification unit 23 notifies the notification object terminal 10B of the MAC address of the sensor device 20. This is done to induce the communication from the notification object terminal 10B addressed to the detected terminal 10X. In such a case, it is possible to induce the communication addressed to the reserved IP address in the sensor device 20 itself and perform adequate processing, such as discard and accumulation of logs, while the terminal relating to reservation is separated from the network segment 2.

However, when the duplication detection unit 22 has detected duplication of the IP address used by the terminal detected 10X and the reserved IP address, the notification unit 23 may notify the notification object terminal 10B of the MAC address of the predetermined terminal connected to the network segment 2. In such a case, it is possible to induce the communication addressed to the reserved IP address in the predetermined terminal and perform adequate processing, such as discard and accumulation of logs, while the terminal relating to reservation is separated from the network segment 2.

Further, when the duplication detection unit 22 has detected duplication of the IP address used by the terminal detected 10X and the reserved IP address, the notification unit 23 may notify the notification object terminal 10B of the MAC address that is not used in the network segment 2. In such a case, the communication addressed to the reserved IP address has unclear destination and rejected in all of the devices of the network segment 2 while the terminal relating to reservation is separated from the network segment 2. Thus, the usage of the reserved IP address can be also prevented by the notification of the MAC address that is not used in the network segment 2.

The communication induction unit 24 induces communication from the detected terminal 10X by notifying the detected terminal 10X of the MAC address of the sensor device 20, MAC address of the predetermined terminal connected to the network segment 2, or MAC address that is not used in the network segment 2 as a MAC address of the terminal on the network segment 2, when duplication of addresses has been detected by the duplication detection unit 22.

Further, the sensor device 20 according to the present embodiment retains the terminal list and reservation list in the storage device 14. FIG. 4 shows an example of configuration of the terminal list according to the present embodiment. The terminal list is a list of the terminals connected to the network segment 2 that have been detected by the sensor device 20, this list serving for storing information including the IP address and MAC address of the terminals. However, the terminal list is not necessarily stored in the sensor device 20. For example, the terminal list may be stored in the manager device 40 and referred to, by the sensor device 20 via the network. Further, the sensor device 20 has an ARP table that is usually used in communication with another terminal on the network segment 2, but the terminal list may be prepared separately from such an ARP table or the ARP table of the sensor device 20 may be used as the terminal list.

FIG. 5 shows by way of example the configuration of the reservation list according to the present embodiment. The reservation list is a list for retaining reserved information including reserved IP addresses and reserved MAC addresses. The reserved IP address as referred to herein is an IP address that is reserved for the desired terminal and prohibited from being used by other terminals on the network segment 2. The reserved IP address is prohibited from being used by other terminals on the network segment 2 regardless of whether or not the terminal to which the reserved IP address has been allocated is presently connected to the network segment 2 and is in the communicable state. The reserved MAC address as referred to herein is a MAC address of the terminal relating to the reserved IP address.

Figure 6:
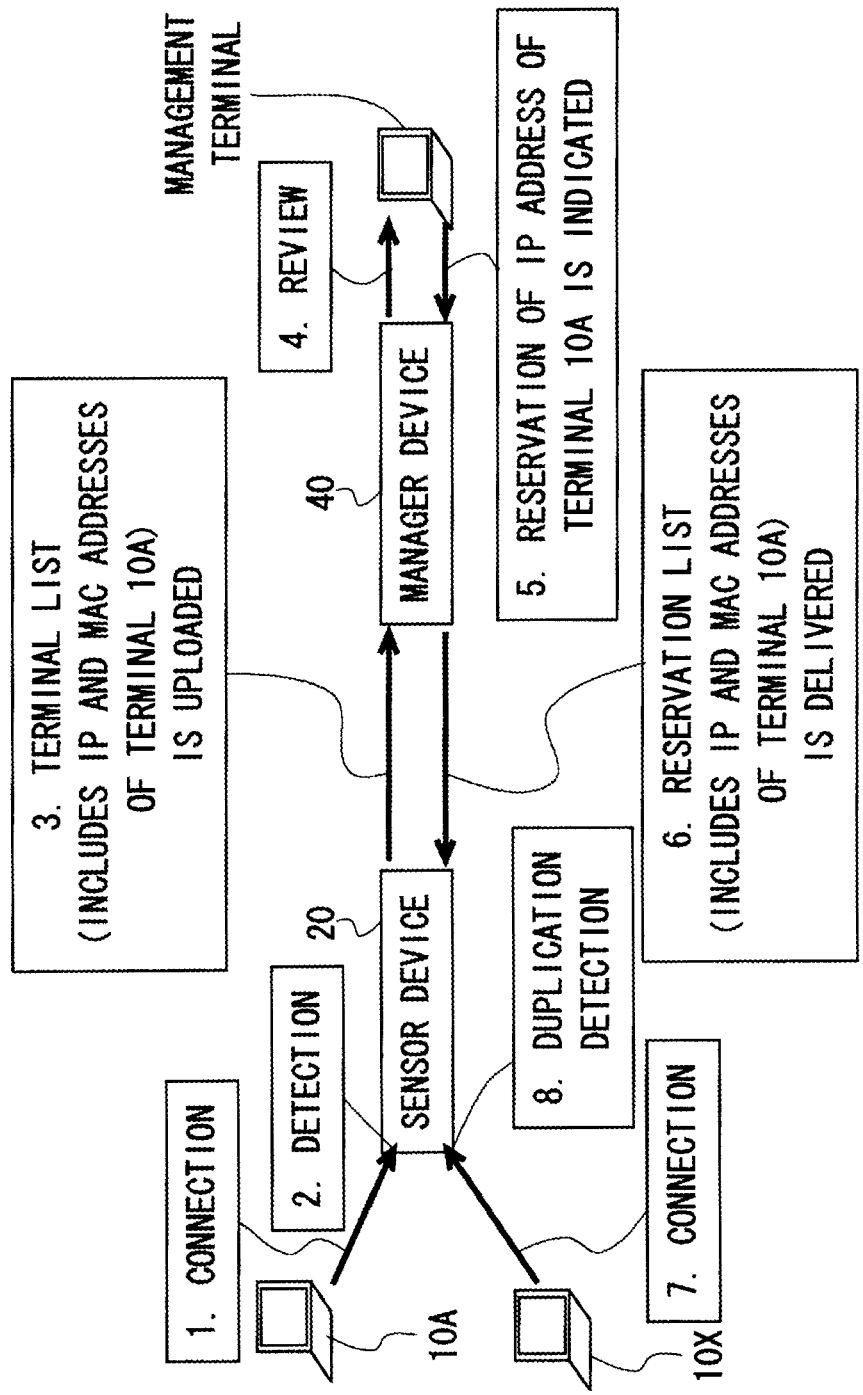
FIG. 6 is a schematic diagram illustrating the creation and delivery method of the received list according to the embodiment.

FIG. 6 is a schematic diagram illustrating a method for creating and delivering the reservation list in the present embodiment. The numbers assigned to the blocks representing the processing contents in the figure indicate the processing sequence. In the present embodiment, the reserved IP address is designated by a system administrator. The sensor device 20 uploads the information of the detected terminals (that is, the contents of the terminal list) to the manager device 40. The system administrator reads the terminal list uploaded from the sensor device 20 to the manager device 40 and indicates the IP address that will be used by the desired terminal as the reserved IP address to the manager device 40 after referring to the system configuration diagram and the like. The manager device 40 delivers to the sensor device 20 the reservation list including the reserved IP address designated by the aforementioned indication and information on the terminal that will use the reserved IP address.

<Process Flow>

The flow of processing executed by the sensor device 20 according to the present embodiment will be explained below with reference to a flowchart.

Figure 7:
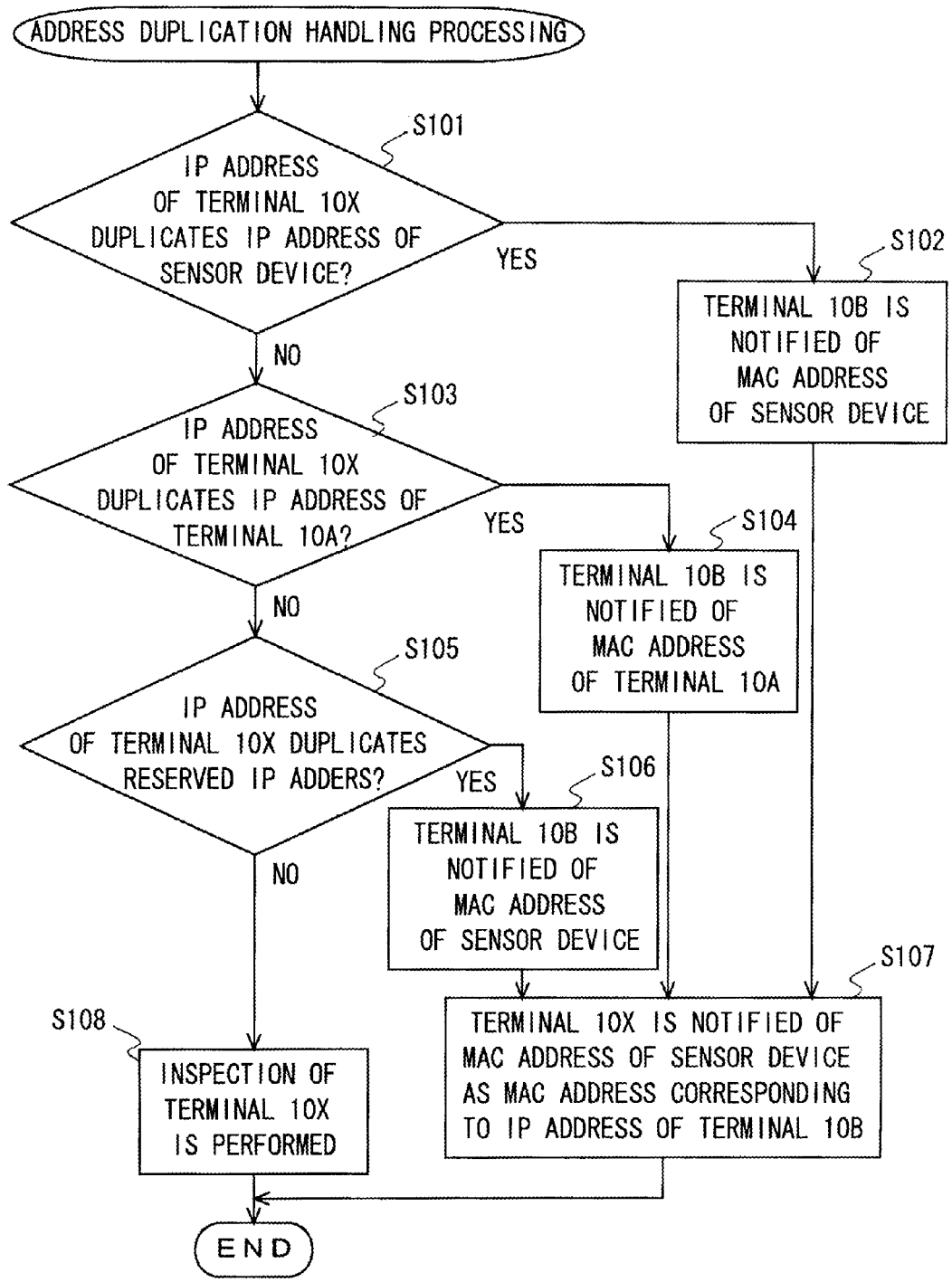
FIG. 7 is a flowchart illustrating the flow of address duplication handling processing according to the present embodiment.

FIG. 7 is a flowchart illustrating the flow of address duplication handling processing according to the present embodiment. The address duplication handling processing according to the present embodiment is started when an ARP address resolution request (referred to hereinbelow as "ARP request") is received by the sensor device 20 and a new terminal is detected by the terminal detection unit 21 in the above-described communication system 1. The specific contents of the processing and the processing sequence shown in the present flow chart are an example for implementing the present disclosure. The processing contents and sequence may be selected as appropriate according to the embodiment. For example, the processing order of the below-described step S102, step S104, or step S106 may be exchanged with that of step S107.

In step S101, it is determined whether or not the IP address of the detected terminal 10X duplicates the IP address of the sonsor device 20. The duplication detection unit 22 acquires the IP address of the detected terminal 10X with reference to the Sender IP of the received ARP request and compares the acquired IP address of the detected terminal 10X with the IP address of the sensor device 20 to detect duplication of the IP addresses. When the comparison result indicates that the IP address of the detected terminal 10X has not been detected to duplicate the IP address of the sensor device 20, the processing advances to step S103. By contrast, where the comparison result indicates that the IP address of the detected terminal 10X has been detected to duplicate the IP address of the sensor device 20, the processing advances to step S102.

In step S102, the notification object terminal 10B is notified of the MAC address of the sensor device 20. When the result of comparison performed in step S101 indicates that the IP address of the detected terminal 10X and the IP address of the sensor device 20 have been detected to duplicate each other, the notification unit 23 sends an ARP request in which the combination of the IP address and MAC address of the sensor device 20 has been set to Sender IP/MAC to the notification object terminal 10B, thereby notifying the notification object terminal 10B of the correct MAC address corresponding to the IP address of the sensor device 20. The detailed flow of communication in the case where the processing shown in step S102 is executed will be described below with reference to FIGS. 8A and 8B. The processing then advances to step S107.

In step S103, it is determined whether or not the IP address of the detected terminal 10X duplicates the IP address used by the known terminal 10A connected to the network segment 2. The duplication detection unit 22 acquires the IP address of the detected terminal 10X with reference to the Sender IP of the received ARP request, compares the IP address and MAC address of the detected terminal 10X with the IP address and MAC address registered in the terminal list retained by the sensor device 20 and determines the presence of terminals for which the IP addresses are the same and the MAC addresses are different, thereby detecting the duplication of IP addresses. In this case, the duplication detection unit 22 may detect duplication of IP addresses by registering the IP address and MAC address of the detected terminal 10X in the terminal list and comparing the IP addresses and MAC addresses in the terminal list after the registration. When the comparison result indicates that the IP address of the detected terminal 10X has not been detected to duplicate the IP address of the known terminal 10A, the processing advances to step S105. By contrast, when the comparison result indicates that the IP address of the detected terminal 10X has been detected to duplicate the IP address of the known terminal 10A, the processing advances to step S104.

In step S104, the notification object terminal 10B is notified of the MAC address of the known terminal 10A. Where the comparison result obtained in step S103 indicates that the IP address of the detected terminal 10X has been detected to duplicate the IP address of the known terminal 10A, the notification unit 23 sends an ARP request in which the combination of the IP address and MAC address of the known terminal 10A has been set to Sender IP/MAC to the notification object terminal 10B, thereby notifying the notification object terminal 10B of the correct MAC address corresponding to the IP address of the known terminal 10A. The detailed flow of communication in the case where the processing shown in step S104 is executed will be described below with reference to FIGS. 9A and 9B. The processing then advances to step S107.

In step S105, it is determined whether or not the IP address of the detected terminal 10X duplicates the reserved IP address. The sensor unit 20 determines whether or not the IP addresses duplicate each other on the basis of the reservation list delivered from manager device 40 and including the reserved IP address and reserved MAC address. More specifically, the duplication detection unit 22 detects the duplication of IP addresses by acquiring the IP address of the detected terminal 10X with reference to the Sender IP of the received ARP request and determines whether or not the IP address of the detected terminal 10X is identical to the reserved IP address and the MAC address of the detected terminal 10X is different from the reserved MAC address. Thus, the duplication detection unit 22 detects the terminal using the reserved IP address as the terminal with the duplicated IP address, regardless of the reserved MAC address is different (regardless of the terminal is different from the terminal relating to the reservation). When the comparison result indicates that the IP address of the detected terminal 10X has not been detected to duplicate the reserved IP address, the processing advances to step S108. By contrast, when the comparison result indicates that the IP address of the detected terminal 10X has been detected to duplicate the reserved IP address, the processing advances to step S106.

In step S106, the notification object terminal 10B is notified of the MAC address of the sensor device 20. When the result of comparison in step S105 indicates that the IP address of the detected terminal 10X has been detected to duplicate the reserved IP address, the notification unit 23 sends an ARP request in which the combination of the MAC address of the sensor device 20 and the reserved IP address has been set to Sender IP/MAC to the notification object terminal 10B. Thus, the notification unit 23 notifies the notification object terminal 10B of the MAC address of the sensor device 20 as the MAC address corresponding to the reserved IP address.

The notification object terminal 10B that has received the ARP request sent from the sensor device 20 in step S106 usually registers and retains the notification contents, that is, the MAC address of the sensor device 20 as the MAC address corresponding to the reserved IP address in the ARP table. For this reason, where in this state the notification object terminal 10B performs communication with the detected terminal 10X address that uses the same IP address as the reserved IP address (for example, when a response to communication from the detected terminal 10X is to be sent), the notification object terminal 10B sets the MAC address of the sensor device 20 to a destination MAC address and sends a packet. Therefore, the packet from the notification object terminal 10B that is addressed to the IP address (duplication with the reserved IP address) used by the detected terminal 10X is received by the sensor device 20. The sensor device 20 discards the received packet without transferring. In other words, with the above-described method, the communication unit 23 of the sensor device 20 cuts off communication from the notification object terminal 10B to the detected terminal 10X. The detailed flow of communication in the case where the processing shown in step S106 is executed will be described below with reference to FIGS. 10A, 10B, and 10C. The processing then advances to step S107.

In step S106, the notification object terminal 10B may be notified of the MAC address of the predetermined terminal connected to the network segment 2. In such a case, it is possible to induce the communication addressed to the reserved IP address and perform adequate processing, such as discard and accumulation of logs, while the terminal relating to reservation is separated from the network segment 2.

In step S106, the notification object terminal 10B may be also notified of the MAC address that is not used in the network segment 2. In this case, the communication addressed to the reserved IP address has unclear destination and is discarded in the devices of the network segment 2 while the terminal relating to reservation is separated from the network segment 2. Thus, the reserved IP address can be prevented from being used by notification of the MAC address that is not used in the network segment 2.

In step S107, communication induction is performed to cut off communication from the detected terminal 10X. The communication induction unit 24 of the sensor device 20 sends to the detected terminal 10X an ARP request notifying of the MAC address of the sensor device 20 as the MAC address corresponding to the IP address of the notification object terminal 10B according to the IP address duplication determination result in step S102, step S104, and step S106. Thus, in the MAC address notified to the detected terminal 10X as the ARP request, the MAC address of the notification object terminal 10B is spoofed (concealed) by the MAC address of the sensor device 20. In other words, the ARP request sent in step S107 is an ARP request for communication induction that serves to induce subsequent communication from the detected terminal 10X to the notification object terminal 10B in the sensor device 20. In the present embodiment, communication induction is performed by sending the ARP request to the detected terminal 10X, but instead of this method, communication induction can be also performed by sending an ARP reply to the ARP request received from the detected terminal 10X. The processing shown in the present flowchart is thereafter ended.

The detected terminal 10X that has received the ARP request for communication induction that has been sent from the sensor device 20 as a result of the processing indicated in step S107 usually registers and retains in the ARP table the notification contents, that is, the MAC address of the sensor device 20 as a MAC address to be used in communication with the notification object terminal 10B (the external network when the notification object terminal 10B is a router). Therefore, when the detected terminal 10X thereafter attempts to communicate with the notification object terminal 10B (communicate with the external network address when the notification object terminal 10B is a router), the packet is sent to the spoofed MAC address of the sensor device 20. The sensor device 20 then discards, without transferring, the packet sent from the detected terminal 10X, with the exception of certain types of communication, such as communication for inspection, authentication, and the like. In other words, with the above-described method, the communication induction unit 24 of the sensor device 20 cuts off the communication of the detected terminal 10X that has not yet been inspected.

In step S108, the inspection of the detected terminal 10X is performed. The sensor device 20 induces the communication performed by the detected terminal 10X in the inspection server 30 by transferring the communication performed by the detected terminal 10X to the inspection server 30, redirecting the HTTP (HyperText Transfer Protocol) performed by the detected terminal 10X to the inspection server 30, or other suitable method, and causes the detected terminal 10X to receive inspection performed by the inspection server 30. Known conventional processing of various types for inspection may be used as the specific processing for inspection, and the explanation thereof in the present embodiment is omitted. The processing shown in the present flowchart is thereafter ended.

When the below-described communication induction performed by the sensor device 20 (see step S107) does not operate effectively, the detected terminal 10X performs communication by designating the correct IP address and correct MAC address to another terminal on the network. The correct MAC address as referred to herein is a MAC address of a communication destination terminal when the communication destination is a terminal on the network segment 2 and a MAC address of a router that is a default gateway when the communication destination is a terminal of the external network. According to the present embodiment, induction of communication with the notification object terminal 10B (router or terminal on the network segment 2) is performed by executing the above-described step S106.

Therefore, when the communication destination is a terminal on the network segment 2, the sent packet reaches the communication destination, but when the return packet from communication destination (for example, a terminal on the network segment 2) is sent, the MAC address of the sensor device 20 is assigned to the destination MAC address for transmission to the network segment 2. Further, when the communication is performed via the router, the sent packet reaches the communication destination (for example, a business server (not shown in the figure) outside the network), but when the return packet from the communication destination is routed by the router, the MAC address of the sensor device 20 is assigned to the destination MAC address for transmission to the network segment 2. The sensor device 20 receives and discards the packet sent from the router or the terminal on the network segment 2 (that is, the packet in which the transmission source MAC address is a MAC address of the router or the terminal on the network segment 2).

Thus, with the sensor device 20 according to the present embodiment, even when the communication indication relating to the detected terminal 10X fails, the communication from the other terminals to the detected terminal 10X can be cut off by inducing and discarding in the sensor device 20 the IP packet sent from the notification object terminal 10B to the detected terminal 10X, from among the communication between the detected terminal 10X and the notification object terminal 10B.

<Sequence>

The detailed flow of communication relating to prevention of problems that can occur when duplication of IP addresses has occurred, this flow being realized by the address duplication handling processing explained with reference to FIG. 7, will be explained below by using the sequence diagram shown in FIGS. 8A to 10C. In the figures, the IP address is indicated by two last positions in decimal representation (in the present embodiment, the ## portion in "192.168.0.##"), and the MAC address is indicated by two last positions in hexadecimal representation. However, only the MAC address of the detected terminal 10X is indicated as "xx".

Figure 8A:
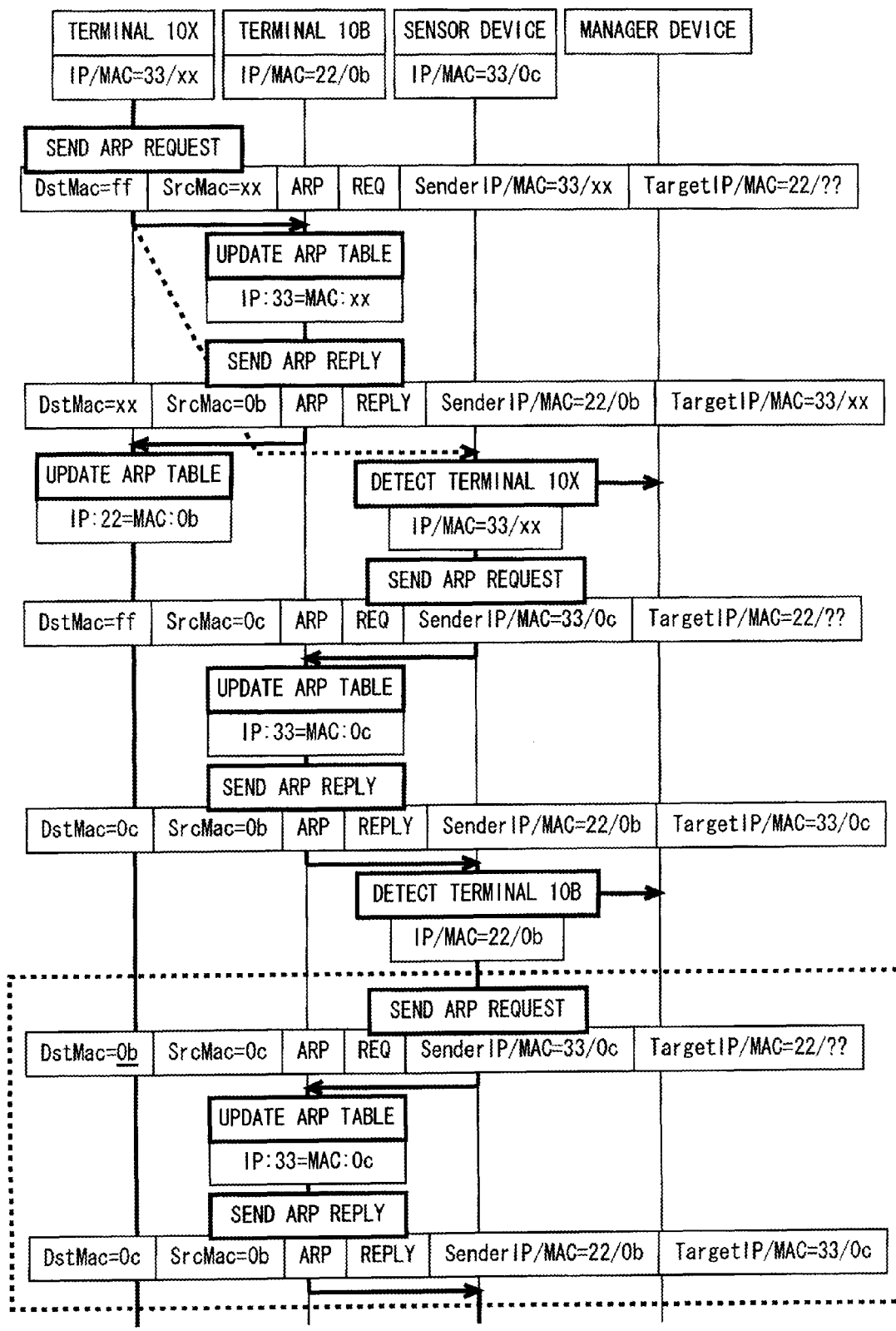
FIG. 8A is a sequence diagram illustrating the detailed flow of communication in the case of executing the processing indicated in step S102 in the flowchart shown in FIG. 7.
Figure 8B:
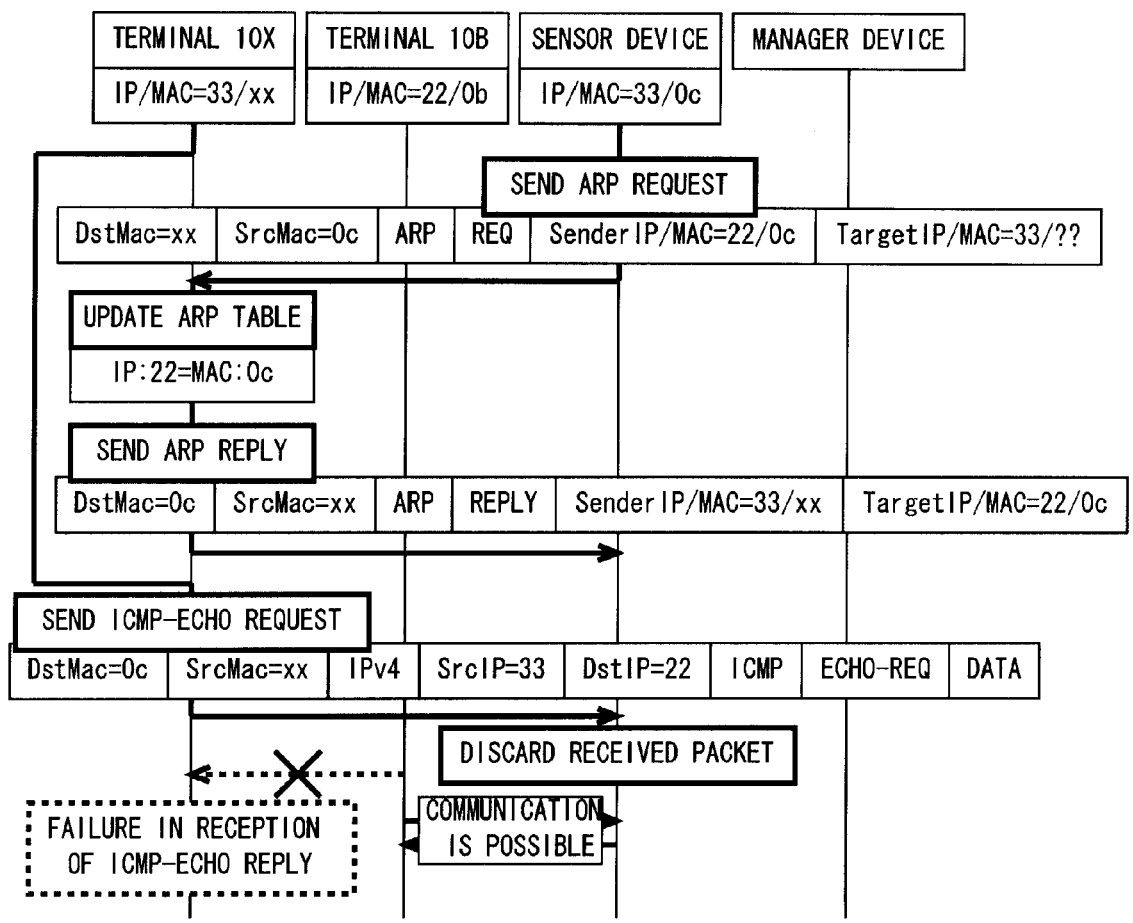
FIG. 8B is a sequence diagram illustrating the detailed flow of communication in the case of executing the processing indicated in step S102 in the flowchart shown in FIG. 7.

FIGS. 8A and 8B are sequence diagrams illustrating the detailed flow of communication in the case of executing the processing shown in step S102 in the flowchart shown in FIG. 7. The sequence flow is from FIG. 8A to FIG. 8B. The notification object terminal 10B and the sensor device 20 are connected to the network segment 2. The detected terminal 10X that has been anew connected to the network segment 2 has the unique MAC address and uses the same IP address as that of the sensor device 20 (192.168.0.33 in the example shown in the figure). In this state, the detected terminal 10X attempts to send a packet to some terminal (in the present embodiment, the notification object terminal 10B) on the network. In the example shown in the figure, the packet which is to be sent by the detected terminal 10X is an echo request (the so-called PING) of an ICMP (Internet Control Message Protocol), but the packet type is not limited to the PING, provided that IP communication from the detected terminal 10X to the notification object terminal 10B is performed.

At this point in time, the detected terminal 10X knows the IP address of the notification object terminal 10B, but does not know the MAC address of the notification object terminal 10B. Therefore, the detected terminal 10X performs address resolution in order to send the packet to the notification object terminal 10B. The detected terminal 10X broadcasts to the network segment 2 the ARP request to perform address resolution of the IP address (192.168.0.22 in the figure) of the notification object terminal 10B. In the sequence diagram shown in FIGS. 8A to 10C, the packet in which the sending destination MAC address (DstMac) of the packet is "ff" is the broadcast packet.

The notification object terminal 10B that has received the ARP request broadcasted by the detected terminal 10X sends to the detected terminal 10X address an ARP reply notifying the terminal of the MAC address of the self-device (notification object terminal 10B) as a response to the ARP request because this ARP request requires address resolution of the IP address used by the self-device (notification object terminal 10B).

In this case, the notification object terminal 10B updates the ARP table retained in the self-device in response to the contents of the ARP request received from the detected terminal 10X. In the example shown in the figure, the notification object terminal 10B records the MAC address of the detected terminal 10X as the MAC address corresponding to the IP address 192.168.0.33 used by the sensor device 20. Even when the notification object terminal 10B has stored in advance the combination of the IP address and MAC address of the sensor device 20 in the ARP table, this information is updated by the contents notified from the detected terminal 10X.

Thus, the ARP request sent by the detected terminal 10X causes the ARP table of the notification object terminal 10B to retain the MAC address of the detected terminal 10X as the MAC address associated with the IP address 192.168.0.33 used by the sensor device 20. Therefore, where this state is allowed to stay, communication between the notification object terminal 10B and the sensor device 20 is impeded and the notification object terminal 10B performs communication with the detected terminal 10X that could have been maliciously added to the network segment 2.

However, in the network segment 2 according to the present embodiment, the sensor device 20 is connected and the sensor device 20 receives the packet flowing in the network segment 2 and detects a new terminal with the terminal detection unit 21. For this reason, where the ARP request broadcasted from the detected terminal 10X is received by the sensor device 20 (in the sequence diagram, the flow in which the sensor device 20 receives the ARP request sent from the detected terminal 10X is shown by a broken line), the sensor device 20 detects the new terminal 10X added to the network segment 2 and executes the address duplication handling processing shown in FIG. 7.

The sensor device 20 also uploads the information on the detected terminal 10X to the manager device 40. The information on the detected terminal that has thus been uploaded to the manager device 40 is reviewed by the system administrator or the like and used for setting the above-described reserved IP address.

Upon detection of the detected terminal 10X, the sensor device 20 executes the address duplication handling processing. In the example shown in the present sequence diagram, where the detected terminal 10X is detected, the duplication detection unit 22 of the sensor device 20 determines whether or not the IP address of the detected terminal 10X duplicates the IP address of the sensor device 20 (see step S101 in FIG. 7). In this case, since the IP address of the detected terminal 10X duplicates the IP address of the sensor device 20, the notification unit 23 of the sensor device 20 notifies the notification object terminal 10B of the MAC address of the sensor device 20 by sending the ARP request in which the combination of the IP address and the MAC address of the sensor device 20 has been set to Sender IP/MAC (see step S102 in FIG. 7).

Where the address duplication handling processing is thus executed, the ARP table of the notification object terminal 10B which retains the MAC address (MAC address of the detected terminal 10X) that has once been mistaken for the MAC address corresponding to the IP address used by the sensor device 20 is again updated and the correct MAC address (MAC address of the sensor device 20) is retained in the ARP table of the notification object terminal 10B as the MAC address corresponding to the IP address used by the sensor device 20.

The ARP request sent by the sensor device 20 to the notification object terminal 10B is sent by broadcasting when the sensor device 20 does not have the MAC address of the notification object terminal 10B in the terminal list, but sent by unicasting to the notification object terminal 10B address (see the processing in the broken line frame in the sequence diagram) when the sensor device 20 already has the MAC address of the notification object terminal 10B in the terminal list. In such a case, processing load on each of the terminals connected to the network segment 2 can be reduced. However, the ARP request sent by the sensor device 20 to the notification object terminal 10B may be also sent by broadcasting, regardless of whether the sensor device 20 already has the MAC address of the notification object terminal 10B in the terminal list. Further, when the MAC address of the notification object terminal 10B is not present in the terminal list, the sensor device 20 uploads the information on the detected notification object terminal 10B to the manager device 40.

How the communication of the detected terminal 10X is cut off by the sensor device 20 will be explained below with reference to FIG. 8B. In order to induce subsequent communication from the detected terminal 10X to the notification object terminal 10B in the sensor device 20, the communication induction unit 24 of the sensor device 20 sends to the detected terminal 10X an ARP request for communication induction in which the IP address of the notification object terminal 10B and the MAC address of the sensor device 20 have been set to Sender IP (see step S107 in FIG. 7). The detected terminal 10X that has received such an ARP request registers the contents set to Sender IP, that is, the MAC address of the sensor device 20 as the MAC address corresponding to the IP address of the notification object terminal 10B in the ARP table and sends an ARP reply to the sensor device 20.

The sensor device 20 that has sent the ARP request for communication induction to the detected terminal 10X receives the ARP reply to the ARP request that has been sent in step S107. This ARP reply is sent from the detected terminal 10X and notifies the sensor device 20 of the MAC address of the detected terminal 10X, but is also an indicator for determining that the communication induction performed in step S107 has not been discarded or cut off in the detected terminal 10X due to the transmission of this reply as a response to the ARP request. When the ARP reply from the detected terminal 10X is not received according to predetermined conditions (for example, when the response rate is equal to or lower than a threshold or the response has been timed out), the sensor device 20 may determine that the communication induction has failed.

Such a communication induction is performed by the sensor device 20, and the detected terminal 10X retains in the ARP table the MAC address of the sensor device 20 as the MAC address corresponding to the IP address of the notification object terminal 10B. Therefore, the PING that is to be sent by the detected terminal 10X to the notification object terminal 10B is sent to the spoofed MAC address of the sensor device 20. By discarding the packet received from the detected terminal 10X, the sensor device 20 cuts off the communication performed by the detected terminal 10X.

Where the address duplication handling processing according to the present embodiment is performed in the communication flow explained hereinabove, when the detected terminal 10X uses the address duplicating the own IP address of the sensor device 20, the notification object terminal 10B that could have been notified of the MAC address of the detected terminal 10X is notified of the MAC address of the sensor device 20 as the MAC address corresponding to the IP address relating to the duplication. As a result, even when the duplication of IP addresses has occurred, the occurrence of problems in the communication with the sensor device 20 as the other party of communication can be prevented.

Figure 9A:
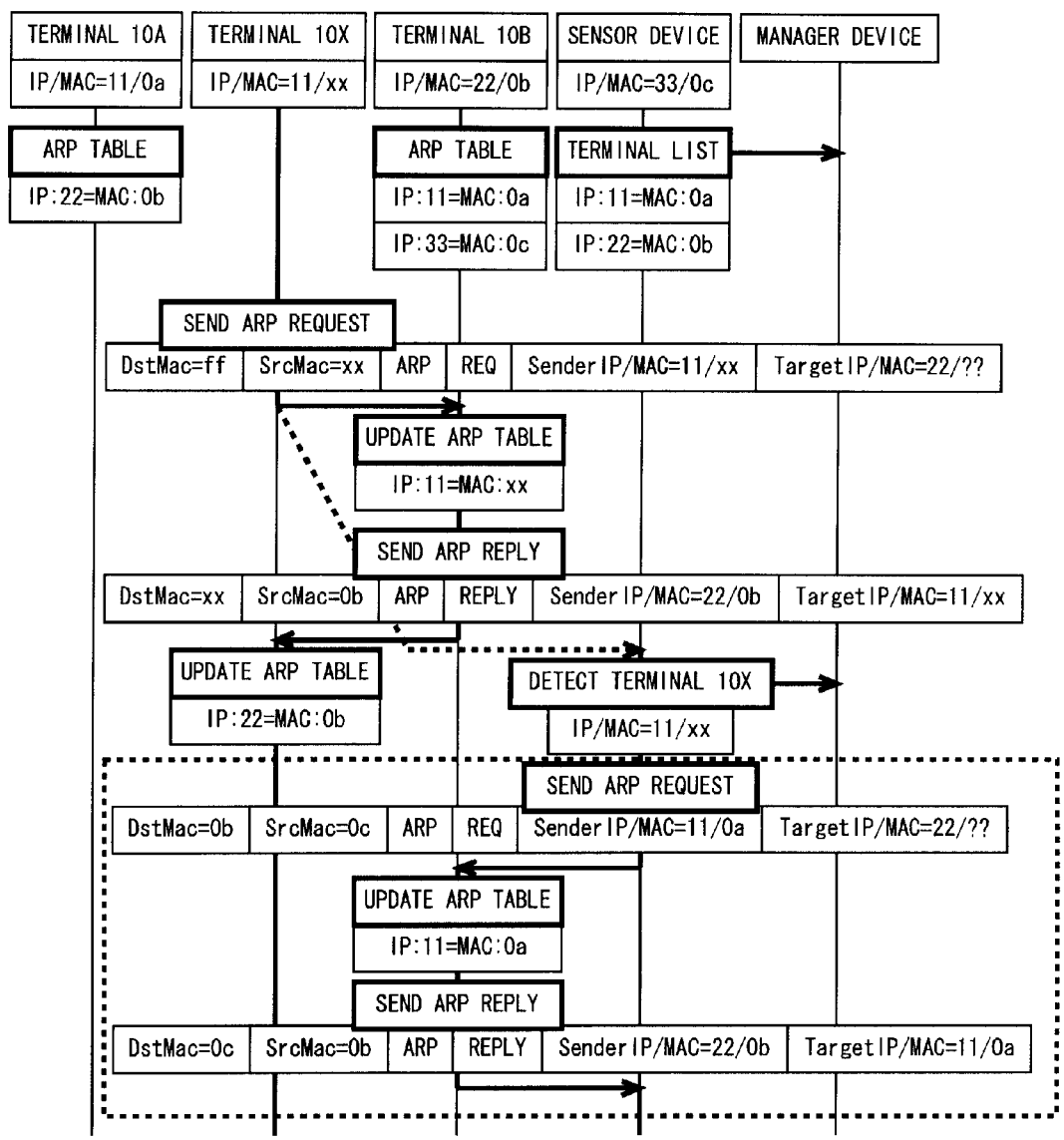
FIG. 9A is a sequence diagram illustrating the detailed flow of communication in the case of executing the processing indicated in step S104 in the flowchart shown in FIG. 7.
Figure 9B:
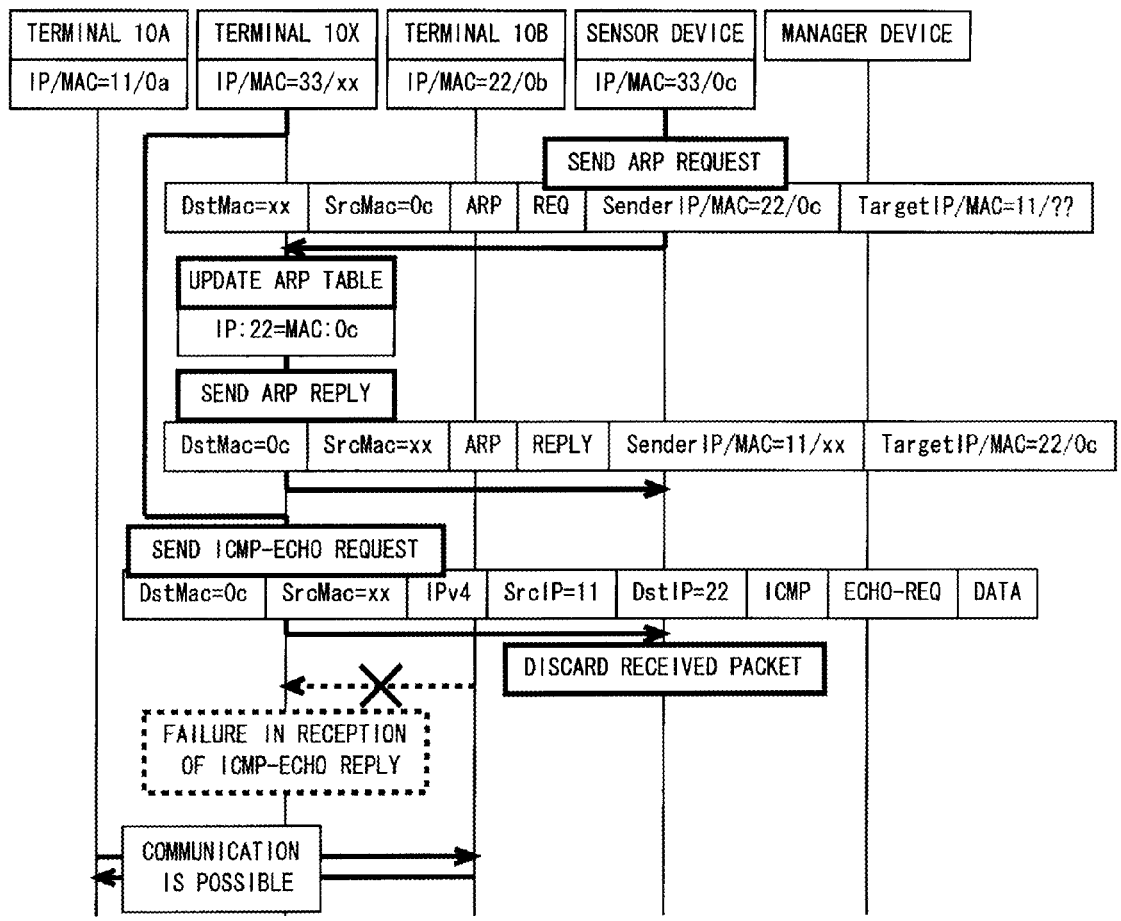
FIG. 9B is a sequence diagram illustrating the detailed flow of communication in the case of executing the processing indicated in step S104 in the flowchart shown in FIG. 7.

FIGS. 9A and 9B are sequence diagrams illustrating the detailed flow of communication in the case of executing the processing shown in step S104 in the flowchart shown in FIG. 7. The sequence flow is from FIG. 9A to FIG. 9B. The known terminal 10A, notification object terminal 10B, and sensor device 20 are connected to the network segment 2. For each terminal in the network segment 2, the correspondence relationship between the IP address and MAC address of other terminals is retained in the ARP table (terminal list in the sensor device 20) of each terminal, depending on the communication between the terminals. For example, the combination of the IP address and MAC address of the notification object terminal 10B is retained in the ARP table of the known terminal 10A, the combination of the IP addresses and MAC addresses of the known terminal 10A and the sensor device 20 is retained in the ARP table of the notification object terminal 10B, and the combination of the IP addresses and MAC addresses of the known terminal 10A and the notification object terminal 10B is retained in the terminal list of the sensor device 20. These terminals perform transmission and reception of ARP packets in the course of mutual IP communication thereof, the processing flow of updating the ARP table being similar to the conventional one. Accordingly, the explanation thereof is herein omitted.

The detected terminal 10X that has been anew connected to the network segment 2 has the unique MAC address, but uses the IP address (192.168.0.11 in the example shown in the figure) identical to that of the known terminal 10A. In this state, the detected terminal 10X attempts to send a packet to some terminal (in the present embodiment, the notification object terminal 10B) on the network. In the example shown in the figure, the packet which is to be sent by the detected terminal 10X is the so-called PING, but the packet type is not limited to PING, provided that the detected terminal 10X performs IP communication with the notification terminal 10B.

At this point in time, the detected terminal 10X knows the IP address of the notification object terminal 10B, but does not know the MAC address of the notification object terminal 10B. Therefore, the detected terminal 10X performs address resolution in order to send the packet to the notification object terminal 10B. The detected terminal 10X broadcasts to the network segment 2 the ARP request to perform address resolution of the IP address (192.168.0.22 in the figure) of the notification object terminal 10B.

The notification object terminal 10B that has received the ARP request broadcasted by the detected terminal 10X sends to the detected terminal 10X address an ARP reply notifying the terminal of the MAC address of the self-device (notification object terminal 10B) as a response to the ARP request because this ARP request requires address resolution of the IP address used by the self-device (notification object terminal 10B).

In this case, the notification object terminal 10B updates the ARP table retained in the self-device in response to the contents of the ARP request received from the detected terminal 10X. In the example shown in the figure, the notification object terminal 10B records the MAC address of the detected terminal 10X as the MAC address corresponding to the IP address 192.168.0.11 used by the known terminal 10A. Even when the notification object terminal 10B has stored in advance the combination of the IP address and MAC address of the known terminal 10A in the ARP table, this information is updated by the contents notified from the detected terminal 10X.

Thus, the ARP request sent by the detected terminal 10X causes the ARP table of the notification object terminal 10B to retain the MAC address of the detected terminal 10X as the MAC address associated with the IP address 192.168.0.11 used by the known terminal 10A. Therefore, where this state is allowed to stay, communication between the notification object terminal 10B and the known terminal 10A is impeded and the notification object terminal 10B performs communication with the detected terminal 10X that could have been maliciously added to the network segment 2.

However, in the network segment 2 according to the present embodiment, the sensor device 20 is connected and the sensor device 20 receives the packet flowing in the network segment 2 and detects a new terminal with the terminal detection unit 21. For this reason, where the ARP request broadcasted from the detected terminal 10X is received by the sensor device 20 (in the sequence diagram, the flow in which the sensor device 20 receives the ARP request sent from the detected terminal 10X is shown by a broken line), the sensor device 20 detects the new terminal 10X added to the network segment 2 and executes the address duplication handling processing shown in FIG. 7.

The sensor device 20 also uploads the information on the detected terminal 10X to the manager device 40. The information on the detected terminal that has thus been uploaded to the manager device 40 is reviewed by the system administrator or the like and used for setting the above-described reserved IP address.

The sensor device 20 receives the detection of the detected terminal 10X and executes the address duplication handling processing. In the example shown in the present sequence diagram, where the terminal 10X is detected, the duplication detection unit 22 of the sensor device 20 determines whether or not the IP address of the detected terminal 10X duplicates the IP address of the known device 10A (see step S103 in FIG. 7). In this case, since the IP address of the detected terminal 10X duplicates the IP address of the known device 10A, the notification unit 23 of the sensor device 20 notifies the notification object terminal 10B of the MAC address of the known device 10A by sending the ARP request in which the combination of the IP address and the MAC address of the known device 10A has been set to Sender IP/MAC (see step S104 in FIG. 7).

Where the address duplication handling processing is thus executed, the ARP table of the notification object terminal 10B which retains the MAC address (MAC address of the detected terminal 10X) that has once been mistaken for the MAC address corresponding to the IP address used by the known device 10A is again updated and the correct MAC address (MAC address of the known device 10A) is retained in the ARP table of the notification object terminal 10B as the MAC address corresponding to the IP address used by the known device 10A.

In the example shown in the present sequence diagram, the ARP request sent by the sensor device 20 to the notification object terminal 10B is sent by unicasting to the notification object terminal 10B address (see the processing in the broken line frame in the sequence diagram) since the sensor device 20 already has the MAC address of the notification object terminal 10B in the terminal list. In such a case, processing load on each terminal connected to the network segment 2 can be reduced. However, the ARP request that is sent by the sensor device 20 to the notification object terminal 10B may be also sent by broadcasting. Further, when the sensor device 20 does not have the MAC address of the notification object terminal 10B in the terminal list, the sensor device uploads the information on the detected notification object terminal 10B to the manager device 40 (the uploading is not shown in the figure).

The communication with the detected terminal 10X performed by the sensor device 20, which is shown in FIG. 9B, is then cut off. The details of the processing are substantially similar to those of the flow of the sequence diagram shown in FIG. 8B, except that the IP address of the detected terminal 10X used in the transmitted and received packet is different, and the explanation thereof is herein omitted.

Where the address duplication handling processing according to the present embodiment is performed in the communication flow explained hereinabove, when the detected terminal 10X uses the address duplicating the IP address of the known terminal 10A, the notification object terminal 10B that could have been notified of the MAC address of the detected terminal 10X is notified of the MAC address of the known terminal 10A as the MAC address corresponding to the IP address relating to the duplication. As a result, even when the duplication of the IP address has occurred, the occurrence of problems in the communication with the known terminal 10A as the other party of communication can be prevented.

Figure 10A:
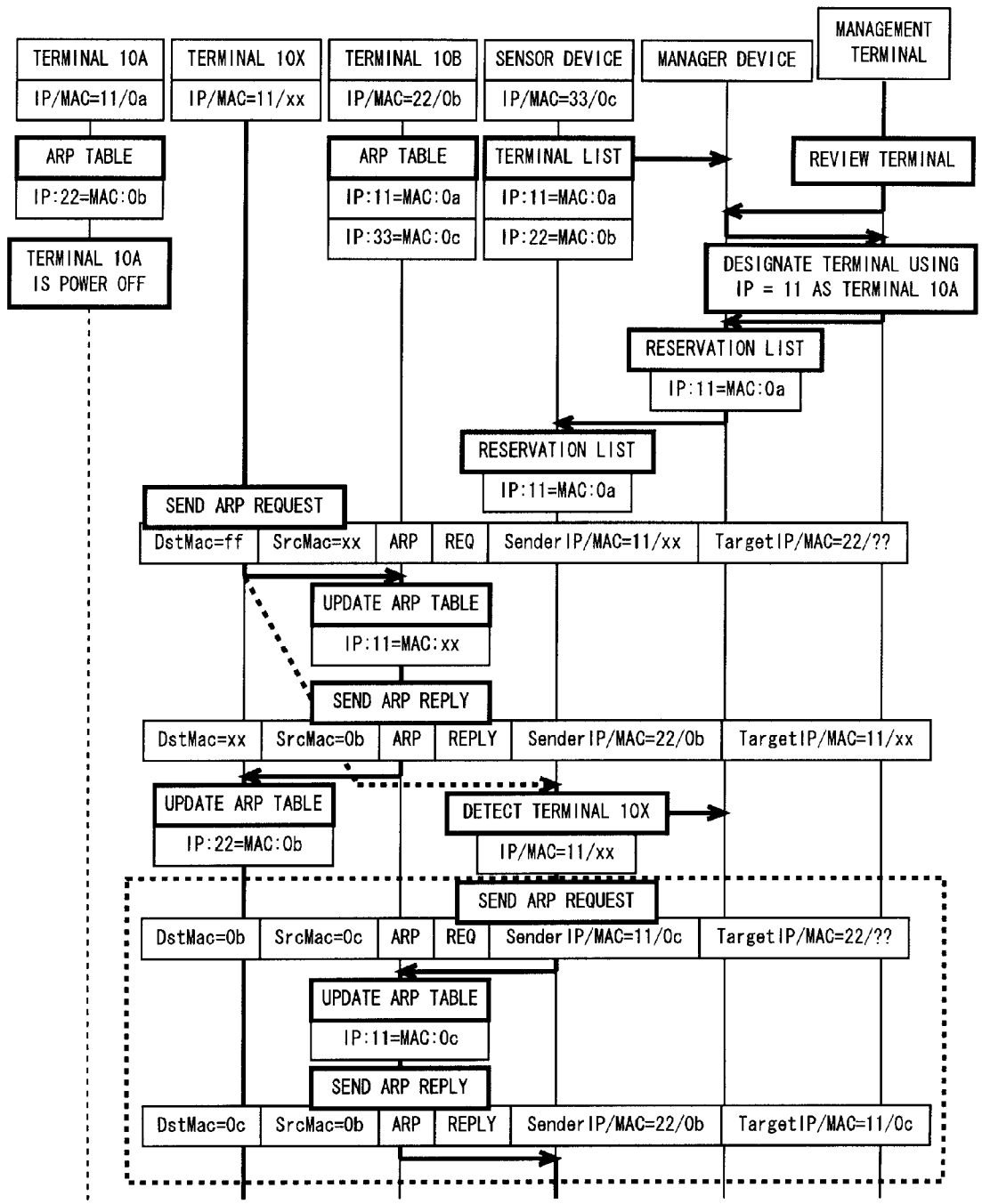
FIG. 10A is a sequence diagram illustrating the detailed flow of communication in the case of executing the processing indicated in step S106 in the flowchart shown in FIG. 7.
Figure 10B:
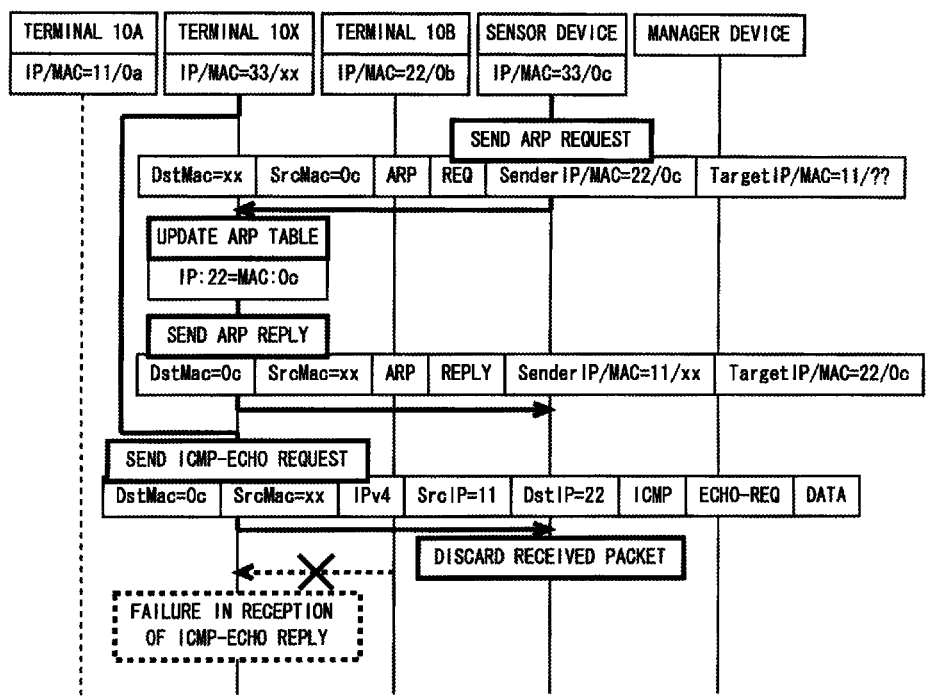
FIG. 10B is a sequence diagram illustrating the detailed flow of communication in the case of executing the processing indicated in step S106 in the flowchart shown in FIG. 7.
Figure 10C:
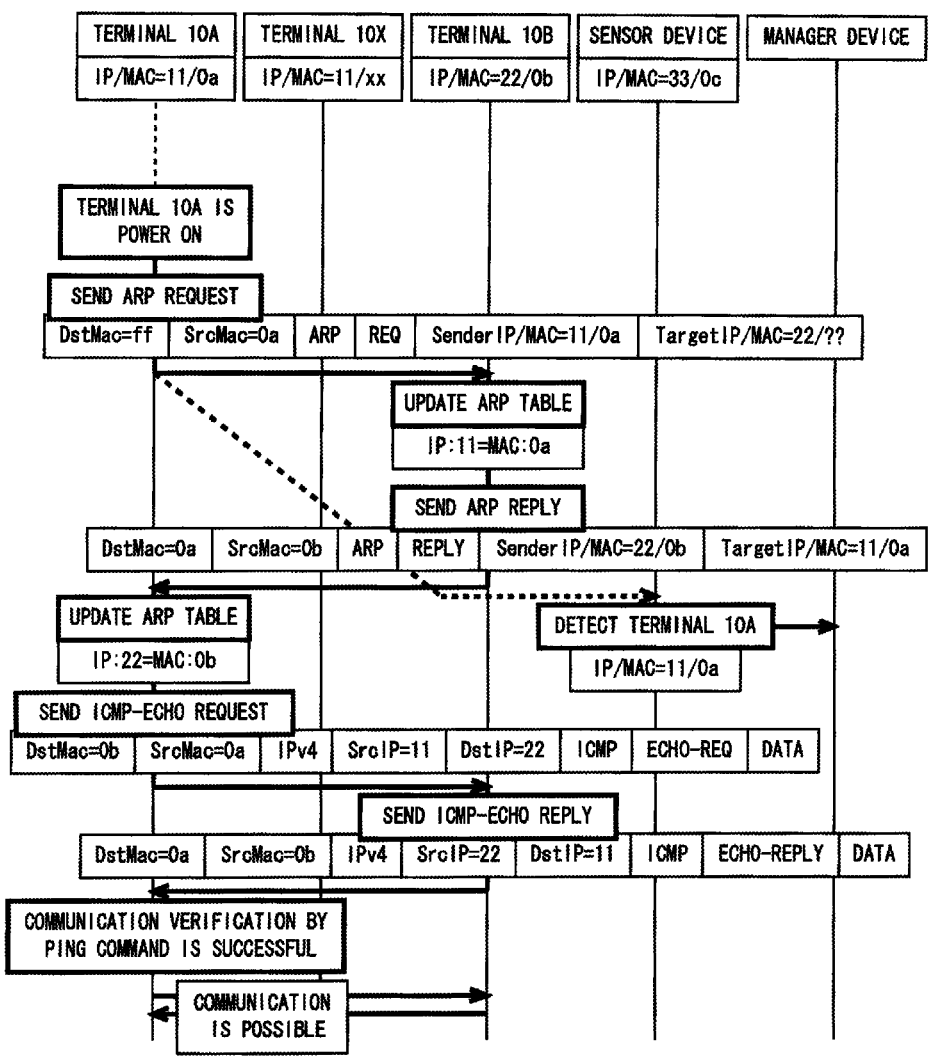
FIG. 10C is a sequence diagram illustrating the detailed flow of communication in the case of executing the processing indicated in step S106 in the flowchart shown in FIG. 7.

FIGS. 10A, 10B, and 10C are sequence diagrams illustrating the detailed flow of communication in the case of executing the processing shown in step S106 in the flowchart shown in FIG. 7. The sequence flows in the order of FIG. 10A, FIG. 10B, and FIG. 10C. The known terminal 10A, notification object terminal 10B, and sensor device 20 are connected to the network segment 2. For each terminal in the network segment 2, the correspondence relationship between the IP address and MAC address of other terminals is retained in the ARP table (terminal list in the sensor device 20) of each terminal, depending on the communication between the terminals. For example, the combination of the IP address and MAC address of the notification object terminal 10B is retained in the ARP table of the known terminal 10A, the combination of the IP addresses and MAC addresses of the known terminal 10A and the sensor device 20 is retained in the ARP table of the notification object terminal 10B, and the combination of the IP addresses and MAC addresses of the known terminal 10A and the notification object terminal 10B is retained in the terminal list of the sensor device 20. These terminals perform transmission and reception of ARP packets in the course of mutual IP communication thereof, the processing flow of updating the ARP table being similar to the conventional one. Accordingly, the explanation thereof is herein omitted.

Further, the sensor device 20 uploads to the manager device 40 a terminal list including the combination of the IP addresses and MAC addresses of the detected known terminal 10A and the notification object terminal 10B. Therefore, the terminal information located in the network segment 2 is accumulated in the manager device 40, and the system administrator can be connected from the administration terminal to the manager device 40 to review the terminal list.

In the example shown in the present sequence diagram, the system administrator designates the terminal using the IP address 192.168.0.11 to the known terminal 10A. In other words, the system administrator reserves the IP address 192.168.0.11 for the known terminal 10A. Where the indication of reservation is performed by the system administrator, the manager device 40 notifies the sensor device 20 of the reservation list including the combination of the reserved IP address 192.168.0.11 and the MAC address of the known terminal 10A, thereby reserving the IP address 192.168.0.11 for the known terminal 10A.

For this reason, even when the known terminal 10A cannot perform communication in the network segment 2, for example, because power of the known terminal 10A is down (see "TERMINAL 10A IS POWER OFF" in FIG. 10A), the IP address 192.168.0.11 that has been used by the known terminal 10A is reserved for the known terminal 10A and the use thereof for other terminals is prohibited.

Further, the detected terminal 10X that has been anew connected to the network segment 2 has the unique MAC address and uses the IP address (192.168.0.11 in the example shown in the figure) identical to the reserved IP address that has been reserved for the known terminal 10A. In this state, the detected terminal 10X attempts to send a packet to some terminal (in the present embodiment, the notification object terminal 10B) on the network. In the example shown in the figure, the packet which is to be sent by the detected terminal 10X is the so-called PING, but the packet type is not limited to PING, provided that the detected terminal 10X performs IP communication with the notification terminal 10B.

At this point in time, the detected terminal 10X knows the IP address of the notification object terminal 10B, but does not know the MAC address of the notification object terminal 10B. Therefore, the detected terminal 10X performs address resolution in order to send the packet to the notification object terminal 10B. The detected terminal 10X broadcasts to the network segment 2 the ARP request to perform address resolution of the IP address (192.168.0.22 in the figure) of the notification object terminal 10B.

The notification object terminal 10B that has received the ARP request broadcasted by the detected terminal 10X sends to the detected terminal 10X address an ARP reply notifying the terminal of the MAC address of the self-device (notification object terminal 10B) as a response to the ARP request because this ARP request requires address resolution of the IP address used by the self-device (notification object terminal 10B).

In this case, the notification object terminal 10B updates the ARP table retained in the self-device in response to the contents of the ARP request received from the detected terminal 10X. In the example shown in the figure, the notification object terminal 10B records the MAC address of the detected terminal 10X as the MAC address corresponding to the reserved IP address 192.168.0.11 for the terminal 10A. Even when the notification object terminal 10B has stored in advance the combination of the IP address and MAC address of the known terminal 10A in the ARP table, this information is updated by the contents notified from the detected terminal 10X.

Thus, the ARP request sent by the detected terminal 10X causes the ARP table of the notification object terminal 10B to retain the MAC address of the detected terminal 10X as the MAC address associated with the reserved IP address 192.168.0.11 for the terminal 10A. Therefore, where this state is allowed to stay, at this point in time the power of the known terminal 10A is OFF, but when the power becomes ON, a communication failure can occur between the notification object terminal 10B and the known terminal 10A. Further, the notification object terminal 10B performs communication with the detected terminal 10X that could have been maliciously added to the network segment 2.

However, in the network segment 2 according to the present embodiment, the sensor device 20 is connected and the sensor device 20 receives the packet flowing in the network segment 2 and detects a new terminal with the terminal detection unit 21. For this reason, where the ARP request broadcasted from the detected terminal 10X is received by the sensor device 20 (in the sequence diagram, the flow in which the sensor device 20 receives the ARP request sent from the detected terminal 10X is shown by a broken line), the sensor device 20 detects the new terminal 10X added to the network segment 2 and executes the address duplication handling processing shown in FIG. 7.

The sensor device 20 uploads the information on the detected terminal 10X to the manager device 40. The information on the detected terminal that has thus been uploaded to the manager device 40 is reviewed by the system administrator or the like and used for setting the above-described reserved IP address.

The sensor device 20 receives the detection of the detected terminal 10X and executes the address duplication handling processing. In the example shown in the present sequence diagram, where the terminal 10X is detected, the duplication detection unit 22 of the sensor device 20 determines whether or not the IP address of the detected terminal 10X duplicates the reserved IP address for the terminal 10A (see step S105 in FIG. 7). In this case, since the IP address of the detected terminal 10X duplicates the reserved IP address, the notification unit 23 of the sensor device 20 notifies the notification object terminal 10B of the MAC address of the sensor device 20 as the MAC address corresponding to the reserved IP address by sending the ARP request in which the combination of the reserved IP address and the MAC address of the sensor device 20 has been set to Sender IP/MAC (see step S106 in FIG. 7).

Where the address duplication handling processing is thus executed, the ARP table of the notification object terminal 10B which retains the MAC address of the detected terminal 10X as the MAC address corresponding to the IP address used by the known terminal 10A is again updated and the MAC address of the sensor device 20 (since the power of terminal 10A is OFF) is retained in the ARP table of the notification object terminal 10B as the MAC address corresponding to the IP address used by the known terminal 10A.

In the example shown in the present sequence diagram, the ARP request sent by the sensor device 20 to the notification object terminal 10B is sent by unicasting to the notification object terminal 10B address (see the processing in the broken line frame in the sequence diagram) since the sensor device 20 already has the MAC address of the notification object terminal 10B in the terminal list. In such a case, processing load of each of the terminals connected to the network segment 2 can be reduced. However, the ARP request sent by the sensor device 20 to the notification object terminal 10B may be also sent by broadcasting. Further, when the MAC address of the notification object terminal 10B is not present in the terminal list, the sensor device 20 uploads the information on the detected notification object terminal 10B to the manager device 40 (such uploading is not shown in the figure).

The communication with the detected terminal 10X performed by the sensor device 20, which is shown in FIG. 10B, is then cut off. The details of the processing are substantially similar to those of the flow of the sequence diagram shown in FIG. 9B, and the explanation thereof is herein omitted.

The flow of communication in the case the communication of the known terminal 10A in the network segment 2 is restarted, for example, by switching ON the power of the known terminal 10A (see "TERMINAL 10A IS POWER ON" in FIG. 10C) is explained below with reference to FIG. 10C. In the processing shown in the present sequence diagram, the known terminal 10A that has been energized by switching on the power attempts to send a packet to the notification object terminal 10B. In the example shown in the figure, the packet that is to be sent by the known terminal 10A is PING, but the packet type is not limited to PING, provided that the known terminal 10A performs IP communication with the notification terminal 10B.

At this point in time, the known terminal 10A knows the IP address of the notification object terminal 10B, but does not know the MAC address of the notification object terminal 10B. Therefore, the known terminal 10A performs address resolution in order to send the packet to the notification object terminal 10B. The known terminal 10A broadcasts the ARP request to perform address resolution of the IP address (192.168.0.22 in the figure) of the notification object terminal 10B.

The notification object terminal 10B that has received the ARP request broadcasted by the known terminal 10A sends to the known terminal 10A address an ARP reply notifying the terminal of the MAC address of the self-device (notification object terminal 10B) as a response to the ARP request because this ARP request requires address resolution of the IP address used by the self-device (notification object terminal 10B).

In this case, the notification object terminal 10B updates the ARP table retained in the self-device in response to the contents of the ARP request received from the known terminal 10A. In the example shown in the figure, the notification object terminal 10B records the MAC address of the known terminal 10A as the MAC address corresponding to the IP address 192.168.0.11 used by the known terminal 10A.

In parallel with such a communication between the known terminal 10A and the notification object terminal 10B, the sensor device 20 receives the packet flowing in the network segment 2 and detects a new terminal with the terminal detection unit 21. Therefore, where the ARP request broadcasted from the known terminal 10A is received by the sensor device 20 (in the sequence diagram, the flow in which the ARP request sent from the known terminal 10A is received by the sensor device 20 is shown by a broken line arrow), the sensor device 20 detects the new known terminal 10A that has been added to the network segment 2 and executes the address duplication handling processing shown in FIG. 7.

The sensor device 20 also uploads the information on the detected known terminal 10A to the manager device 40. The information on the detected terminal that has thus been uploaded to the manager device 40 is reviewed by the system administrator or the like and used for setting the above-described reserved IP address.

Where the known terminal 10A is detected, the duplication detection unit 22 of the sensor device 20 determines whether the IP address of the detected known terminal 10A duplicates any of the IP address of the sensor device 20, IP address of the known terminal 10A, and reserved IP address for the terminal 10A (see step S101, step S103, and step S105 in FIG. 7). In this case, the IP address of the detected known terminal 10A does not duplicate any of the IP address of the sensor device 20, IP address of the known terminal 10A, and reserved IP address for the terminal 10A. Therefore, the sensor device 20 executes the processing for performing inspection with respect to the known terminal 10A (see step S108 in FIG. 7).

Since the address resolution of the ARP request sent by the known terminal 10A has been successful and the known terminal 10A could acquire the correct MAC address of the notification object terminal 10B, PING from the known terminal 10A to the notification object terminal 10B is successful. Thus, in this state, the known terminal 10A can communicate with other terminals on the network segment 2 by using correctly the reserved IP address, regardless of the presence of the detected terminal 10X that attempted to use the reserved IP address for the terminal 10A.

By executing the address duplication handling processing according to the present embodiment in the communication flow explained hereinabove, it is possible to induce the communication addressed to the reserved IP address in the sensor device 20 and perform adequate processing, such as discard and accumulation of logs, while the known terminal 10A relating to reservation is separated from the network segment 2. As a result, any terminal other than the known terminal 10A can be prevented from using the reserved IP address while the known terminal 10A relating to reservation is separated from the network segment 2, and when the terminal relating to reservation returns to the network segment 2, the address that has already been reserved can be used.

In the present embodiment, MAC address notification for communication induction and communication induction cancellation is performed by using an ARP request or ARP reply, but the method used for MAC address notification is not limited to the embodiment explained hereinabove by using the flowchart. For example, MAC address notification can be also performed by using an ARP reply or GARP in a step in which MAC address notification has been performed using an ARP request. Further, other protocols may be also used for MAC address notification.

What is claimed is:

1. An information processing device comprising:
 a processor programmed with executable instructions causing the processor to operate as
  a terminal detection unit to detect a terminal connected to a network;
  a duplication detection unit to detect duplication of upper layer addresses by comparing an upper layer address used by a detected terminal that has been detected by the terminal detection unit with a predetermined upper layer address; and
  a notification unit to notify a notification object terminal that could have been notified of a lower layer address of the detected terminal by the detected terminal, of a lower layer address of a terminal other than the detected terminal, when duplication of the upper layer addresses has been detected by the duplication detection unit,
 wherein the duplication detection unit detects duplication of the upper layer address used by the detected terminal and an upper layer address of the information processing device, and
 the notification unit notifies the notification object terminal of a lower layer address of the information processing device when duplication of the upper layer address used by the detected terminal and the upper layer address of the information processing device has been detected by the duplication detection unit.

2. The information processing device according to claim 1, wherein
 the duplication detection unit detects duplication of the upper layer address used by the detected terminal and an upper layer address of a known terminal connected to the network, and
 the notification unit notifies the notification object terminal of a lower layer address of the known terminal when duplication of the upper layer address used by the detected terminal and the upper layer address of the known terminal has been detected by the duplication detection unit.

3. The information processing device according to claim 1, wherein
 the notification unit notifies the notification object terminal of a lower layer address of the information processing device when duplication of the upper layer address used by the detected terminal and the reserved upper layer address has been detected by the duplication detection unit.

4. The information processing device according to claim 1, wherein
 the notification unit notifies the notification object terminal of a lower layer address of a predetermined terminal connected to the network when duplication of the upper layer address used by the detected terminal and the reserved upper layer address has been detected by the duplication detection unit.

5. The information processing device according to claim 1, wherein
 the notification unit notifies the notification object terminal of a lower layer address that is not used in the network when duplication of the upper layer address used by the detected terminal and the reserved upper layer address has been detected by the duplication detection unit.

6. The information processing device according to claim 1, further comprising:
 a communication induction unit to induce, when duplication of addresses has been detected by the duplication detection unit, communication from the detected terminal by notifying the detected terminal of a lower layer address of the information processing device, a lower layer address of the predetermined terminal connected to the network, or a lower layer address that is not used by the network, as a lower layer address of a terminal on the network.

7. An address duplication handling method for causing a computer to execute:
 detecting a terminal connected to a network;
 detecting duplication of upper layer addresses by comparing an upper layer address used by a detected terminal that has been detected in the detecting of the terminal with a predetermined upper layer address; and
 notifying a notification object terminal that could have been notified of a lower layer address of the detected terminal by the detected terminal, of a lower layer address of a terminal other than the detected terminal, when duplication of the upper layer addresses has been detected in the detecting of duplication,
 wherein the detecting of duplication involves detecting duplication of the upper layer address used by the detected terminal and an upper layer address of the computer, and
 the notifying a notification object terminal notifies the notification object terminal of a lower layer address of the computer when duplication of the upper layer address used by the detected terminal and the upper layer address of the computer has been detected by the detecting of duplication of the upper layer addresses.

8. A computer-readable non-transitory recording medium having stored therein an address duplication handling program for causing a computer to execute:
 detecting a terminal connected to a network;
 detecting duplication of upper layer addresses by comparing an upper layer address used by a detected terminal that has been detected in the detecting of the terminal with a predetermined upper layer address; and
 notifying a notification object terminal that could have been notified of a lower layer address of the detected terminal by the detected terminal, of a lower layer address of a terminal other than the detected terminal, when duplication of the upper layer addresses has been detected in the detecting of duplication,
 the detecting of duplication involves detecting duplication of the upper layer address used by the detected terminal and an upper layer address of the computer, and
 the notifying a notification object terminal notifies the notification object terminal of a lower layer address of the computer when duplication of the upper layer address used by the detected terminal and the upper layer address of the computer has been detected by the detecting of duplication of the upper layer addresses.

9. The information processing device according to claim 1, further comprising:
a communication induction unit to induce communication from the detected terminal by notifying the detected terminal of, as a lower layer address of a terminal on the network, a lower layer address of the information processing device, a lower layer address of the predetermined terminal connected to the network, or a lower layer address that is not used by the network, when duplication of addresses has been detected by the duplication detection unit.

10. The information processing device according to claim 2, further comprising:
a communication induction unit to induce communication from the detected terminal by notifying the detected terminal of, as a lower layer address of a terminal on the network, a lower layer address of the information processing device, a lower layer address of the predetermined terminal connected to the network, or a lower layer address that is not used by the network, when duplication of addresses has been detected by the duplication detection unit.

11. The information processing device according to claim 1, further comprising:
a communication induction unit to induce communication from the detected terminal by notifying the detected terminal of, as a lower layer address of a terminal on the network, a lower layer address of the information processing device, a lower layer address of the predetermined terminal connected to the network, or a lower layer address that is not used by the network, when duplication of addresses has been detected by the duplication detection unit.

12. The information processing device according to claim 3, further comprising:
a communication induction unit to induce communication from the detected terminal by notifying the detected terminal of, as a lower layer address of a terminal on the network, a lower layer address of the information processing device, a lower layer address of the predetermined terminal connected to the network, or a lower layer address that is not used by the network, when duplication of addresses has been detected by the duplication detection unit.

13. The information processing device according to claim 4, further comprising:
a communication induction unit to induce communication from the detected terminal by notifying the detected terminal of, as a lower layer address of a terminal on the network, a lower layer address of the information processing device, a lower layer address of the predetermined terminal connected to the network, or a lower layer address that is not used by the network, when duplication of addresses has been detected by the duplication detection unit.

14. The information processing device according to claim 5, further comprising:
a communication induction unit to induce communication from the detected terminal by notifying the detected terminal of, as a lower layer address of a terminal on the network, a lower layer address of the information processing device, a lower layer address of the predetermined terminal connected to the network, or a lower layer address that is not used by the network, when duplication of addresses has been detected by the duplication detection unit.

15. The information processing device according to claim 1, wherein the duplication detection unit detects duplication of the upper layer address used by the detected terminal and a reserved upper layer address.

* * * * *